Figure 1:
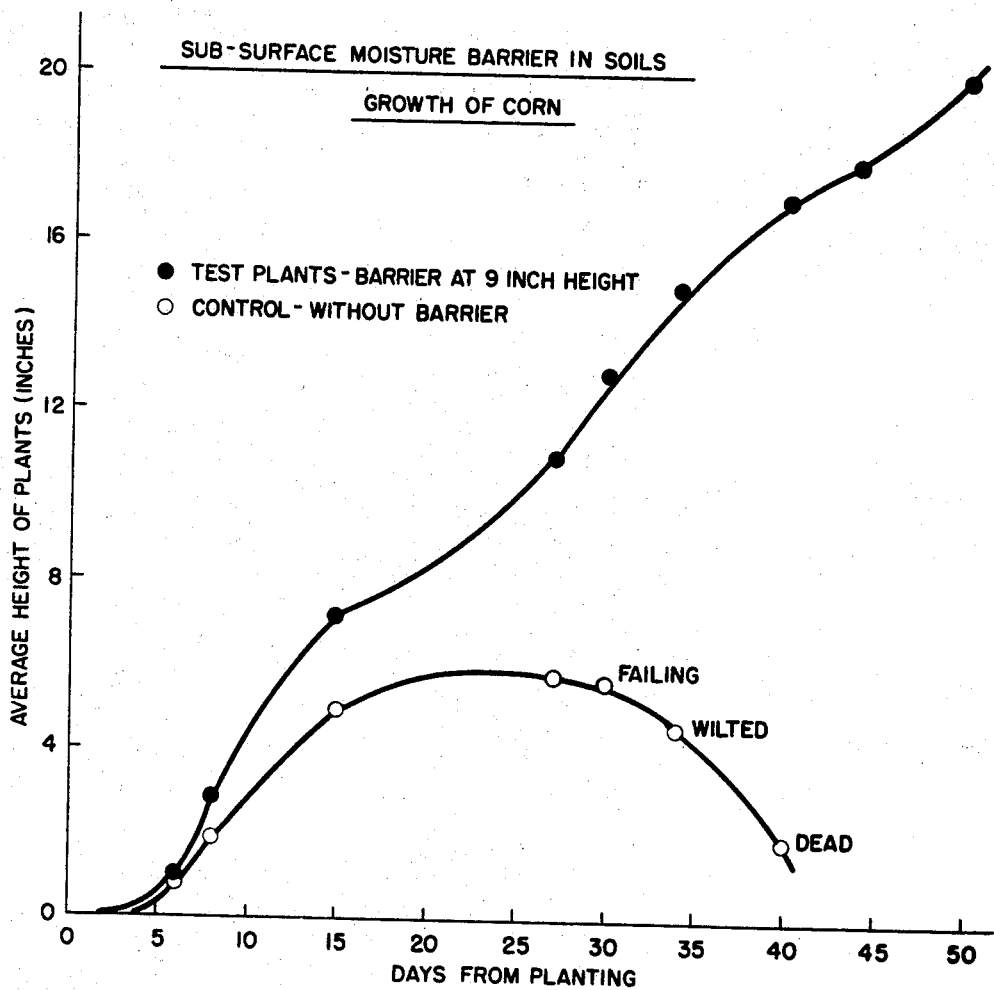

William R. Thompson
Brian Adams      Inventors

By W.O. 7 Heilman

Patent Attorney

United States Patent Office 3,394,551
Patented July 30, 1968

3,394,551
APPARATUS FOR AND METHOD OF INSTALLING SUB-SURFACE MOISTURE BARRIER IN SOILS
William R. Thompson and Brian Adams, Sarnia, Ontario, Canada, assignors to Esso Research and Engineering Company, a corporation of Delaware
Continuation-in-part of application Ser. No. 228,162, Oct. 3, 1962. This application Oct. 20, 1966, Ser. No. 590,167
4 Claims. (Cl. 61—1)

This application is a continuation-in-part of U.S. Ser. No. 228,162, filed Oct. 3, 1962, now abandoned.

The present invention is concerned with an improved method and apparatus for increasing crop yields in semi-arid regions, utilizing a particular technique of providing a moisture barrier in soils. In particular, this invention relates to a novel improved method and apparatus for maximizing crop production from a given acreage in semi-arid regions which receive an insufficient amount of natural rainfall to ensure seed germination and to sustain the growth of such crops without irrigation by conserving and utilizing the moisture common to such acreage through natural means.

The invention is specifically concerned with a technique for the prevention of moisture loss by seepage particularly in sandy soils. A barrier composed of a petroleum product or other suitable impervious membrane is laid down at a critical and predetermined distance below the surface. This membrane, as for example a petroleum barrier, functions to prevent the rapid loss of water downwardly by drainage and to retain it near the surface and agriculture roots, thereby making sandy areas useful for agriculture.

In the United States and Canada there exist millions of acres of potentially valuable crop lands which do not receive sufficient rainfall and which in many cases drain off moisture very rapidly due to the high porosity of the soil. Also, wind erosion and other climatic conditions have served to accentuate these lack of moisture problems. Thus, in many parts of the world the land is barren of useful vegetation because of the lack of water. However, in many of these places the lack of moisture is not due to insufficient rainfall but is due to the fact that the soil is mainly sand and has very poor moisture-retaining properties. Therefore, in accordance with the present invention, a barrier such as petroleum asphalt is deposited at a critical distance below the earth's surface. This barrier functions to prevent the rapid loss of water downwardly in the soil and retains it near the surface and the growing roots, thereby making agriculture possible. The process and technique of the present invention may be readily understood by the following examples illustrating the same.

In these tests, two wooden boxes 12" x 18" by 14" deep with slits in the bottom to allow drainage were used to hold experimental seed beds. The seed beds were prepared from a coarse sand obtained at the ground surface near Lake Huron. In Example 1, the box was filled with sand to a depth of about 9 inches. Then the surface was tamped level and sprayed uniformly with 40 grams of an asphalt-water emulsion. The barrier was prepared with 40.0 grams of a 50/50 emulsion of asphalt and water. The barrier 12" x 18" in area was then composed of 20 grams of asphalt. Approximately 3½ inches of sand were then placed above the barrier. A control box was prepared by simply filling with sand to a depth of 12 inches. In each box was planted corn and soya beans all at a depth of 1½ inches. The boxes were placed on the rooftop in full sunlight with a clear plastic cover above to keep out rainfall. Water was added by sprinkling each at intervals, with the same carefully measured volume of water. Interval and volume were scaled to the rainfall at Tegiura, Libya during the rainy season during the 1961 period.

Example 1

In this test wherein the asphalt barrier was placed about 3½ inches below the surface of the sandy soil, within six days the crops planted in the terrain containing the barrier germinated, whereas the crops in the terrain not containing the barrier did not germinate until ten days later. For the first four weeks the crops planted in the barriered area grew to about six inches in height as compared to the three inches of height attained by the crops in the area not containing the barrier.

However, during the month of May when the rainfall approximated 0.28 inch, the corps in the terrain containing the barrier wilted and died, whereas the crops in the areas not containing the barried lived.

Example 2

In a second test conducted during May, June and July under identical conditions described with respect to Example 1 except that the barrier was placed about 9 inches below the surface, all crops germinated in approximately the same time, and the height attained by the respective crops was approximately the same within the first two weeks. However, in the succeeding dry six-week period the crops in the terrain containing the barrier thrived to the extent of reaching a height of 24 inches for the corn and 12 inches for the beans as compared to complete failure of the crops in the area not containing the barrier. The results are tabulated in the following table and graphically illustrated in FIGURE 1.

GROWTH OF CORN

| Rainfall, inches | Days From Planting | Height of Corn (Inches) | |
|---|---|---|---|
| | | Without Barrier | With Barrier |
| 0.28 | 3 | | |
| | 6 | Germination | Germination |
| 0.28 | 8 | 1 | 2 |
| 0.28 | 13 | | |
| | 15 | 4 | 6 |
| 0.28 | 21 | | |
| | 27 | 5 | 10 |
| | 30 | Failing | 12 |
| | 34 | Badly Wilted | 14 |
| 0.42 | 35 | | |
| | 40 | Dead | 16 |
| | 44 | — | 17 |
| 0.37 | 50 | — | 19 |
| | 55 | — | 24 |
| 0.28 | 61 | — | 26 |
| | 68 | — | 30 |

From the foregoing it is evident that, when the barrier was only 3½ inches below the surface the moisture was retained too close to the surface and during the dry hot spell, rapid evaporation of the retained moisture occurred, resulting in the wilting and dying of the crops. On the other hand, in Example 2 when the barrier was 9 inches below the surface, this rapid evaporation did not occur as the moisture was retained at a deeper level and the crops made good progress.

As mentioned above and illustrated by the examples, the position of the barrier with respect to the surface is critical, i.e. the barrier must be far enough below the surface so as to prevent the rapid evaporation of moisture. As a minimum depth the barrier should be at least about 8 to 14, e.g. 9 to 12 inches below the surface of the soil. Of course, the barrier may and in some applications will be at a depth greater than the minimum depth. For example, the barrier may be at depths of up to about 2 to 3 feet below the surface. The optimum depth for any particular application will be influenced of course by several factors such as the particular crop, the soil composition etc.; but will in all applications be at least as deep as the described minimum depth. For most common crops such as beans, corn, tomatoes, potatoes, etc., and the like, the barrier will not need to be as deep as when used with trees, such as fruit trees.

As pointed out heretofore, the barrier is preferably a petroleum product, as for example, a petroleum asphalt film or a wax film. The barrier may comprise a heavy crude or other type of suitable membrane. The preferred type of asphalt film is applied as an asphalt-in-water emulsion wherein the amount of asphalt present in the emulsion is in the range from about 20 to 65%, preferably in the range from about 40 to 55% by weight.

The laying of the barrier at the desirable depth can be accomplished in a number of ways. For example, a rig similar in operation to a seed drill or an ammonia drill is designed to inject a suitable liquid product at the desired depth. Also, deep cutting ploughs with a spraying tube at the trailing end of the base can be used to spray the bottom of the furrow as it is ploughed. A thin steel foil may be pushed through the ground by a bulldozer and the product sprayed into the ground from the trailing edge of the foil.

Figure 2:
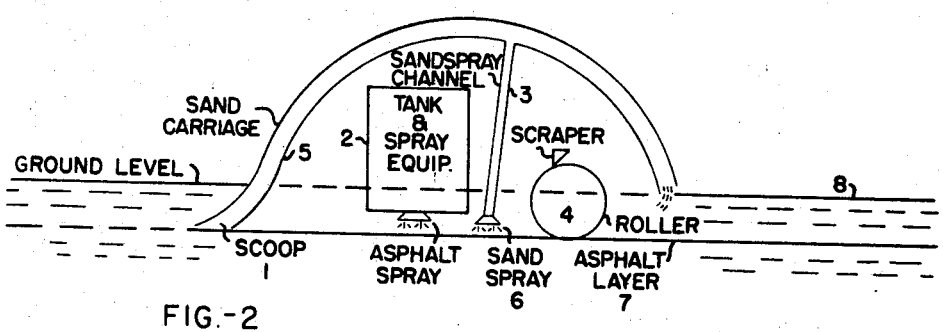

A mechanical machine or device can be used similar to that used in road building wherein the required depth of top soil is momentarily lifted at the front of the machine as it moves forward and wherein the required film is positioned and placed at an intermediate point within the machine and wherein the top soil removed at the front of the machine is replaced at the rear of the machine. A machine such as this is illustrated in FIGURE 2 and functions as follows: The sand scoop 1 penetrates below the ground surface about one foot, and as the machine moves forward, the surface sand is scooped up and carried overhead in the sand carrier system 5. At the same time the surface of the shallow trough formed is sprayed with liquid asphalt by spray equipment 2. Immediately behind the asphalt spray is a sand spray 6 which spreads a thin covering layer of sand over the asphalt. A roller 4 follows the sand spray and comprises the asphalt sand mixture into a tight barrier. The bulk of the sand is dropped back over the barrier from the rear of the machine, thus completing the operation. Thus, an asphalt barrier 7 is readily positioned below the surface of the soil 8.

What is claimed is:

1. A method of placing a substantially continuous moisture barrier strip at a predetermined distance beneath the surface of the soil in order to improve the growth of crops above said moisture barrier strip which comprises the following steps in combination,
    (a) removing surface soil to said predetermined distance thereby forming a continuous trough,
    (b) temporarily storing said removed surface soil,
    (c) spraying a liquid petroleum product in said trough, thereby substantially covering the bottom of said trough with a layer of liquid petroleum product,
    (d) spraying a portion of said stored surface soil onto said layer of liquid petroleum product, thereby forming a thin layer of soil over said layer of liquid petroleum product,
    (e) compressing said thin layer of soil and said layer of liquid petroleum product, thereby forming a substantially continuous moisture barrier, and
    (f) filling said trough with the remaining portion of said stored surface soil.

2. A method as defined by claim 1 wherein said liquid petroleum product comprises an asphalt-in-water emulsion.

3. A method as defined by claim 1 wherein said predetermined distance is at least 8 to 14 inches below the surface.

4. A mobile apparatus for continuously laying a moisture barrier at a predetermined distance below the surface of the ground in order to improve the growth of crops above said barrier, which comprises in combination
    (a) scoop means so constructed and arranged to penetrate the ground surface said predetermined depth, remove soil at the point of penetration to form a trough in the ground and convey said soil elsewhere in said apparatus,
    (b) spray assembly means comprising tank means constructed and arranged to hold a liquid form of a moisture barrier and spray means constructed and arranged to spray said liquid to form a layer of moisture barrier at the bottom of said trough,
    (c) soil spray means constructed and arranged to spray a small amount of soil on the top of said barrier in said trough,
    (d) compression means so constructed and arranged so as to compress said barrier and soil combination,
    (e) covering means adapted and constructed to fill in said trough after said compression, and
    (f) conveyance means for moving said apparatus along the ground and wherein said soil-removing means and said soil-replacement means are connected with conduit means.

References Cited

UNITED STATES PATENTS

| | | |
|---|---|---|
| 25,703 | 10/1859 | Miller et al. |
| 668,362 | 2/1901 | Tomlinson _____ 61—13 |
| 2,158,952 | 5/1939 | Timberlake _____ 61—13 X |
| 2,201,459 | 5/1940 | Van Hulst _____ 61—36 |
| 3,276,208 | 10/1966 | Bolt _____ 61—1 |
| 3,309,875 | 3/1967 | Niederwemmer _____ 61—13 |

EARL J. WITMER, *Primary Examiner.*